United States Patent
Yang et al.

(10) Patent No.: US 9,118,803 B2
(45) Date of Patent: Aug. 25, 2015

(54) VIDEO CONFERENCING SYSTEM

(71) Applicant: Quanta Computer Inc., Kuei Shan Hsiang, Tao Yuan Shien (TW)

(72) Inventors: Rong-Chin Yang, Tao Yuan Shien (TW); Yen-Ching Yu, Tao Yuan Shien (TW); Ching-Hui Chiu, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 60 days.

(21) Appl. No.: 14/202,261

(22) Filed: Mar. 10, 2014

(65) Prior Publication Data

US 2015/0189231 A1   Jul. 2, 2015

(30) Foreign Application Priority Data

Dec. 26, 2013  (TW) .............................. 102148364 A (51) Int. Cl.
*H04N 7/15* (2006.01)
*H04N 7/14* (2006.01)

(52) U.S. Cl.
CPC . *H04N 7/147* (2013.01); *H04N 7/15* (2013.01)

(58) Field of Classification Search
CPC ........... H04N 7/15; H04N 7/152; H04N 7/14; H04N 7/147; H04N 5/268
USPC .............. 348/14.01–14.12; 715/753; 709/204
See application file for complete search history.

(56) References Cited

U.S. PATENT DOCUMENTS

| | | | | |
|---|---|---|---|---|
| 6,580,447 B2 * | 6/2003 | Shimizu et al. | ............ | 348/14.11 |
| 2014/0340465 A1 * | 11/2014 | Shi et al. | ................... | 348/14.03 |

FOREIGN PATENT DOCUMENTS

CN   101 159 843   4/2008

OTHER PUBLICATIONS

European Search Report dated Sep. 26, 2014.
English language translation of abstract of CN 101 159 843 (published Apr. 9, 2008).
Birch, C.H.; "MPEG Splicing and Bandwidth Management;" Scientific-Atlanta, Inc., Canada; Sep. 12, 1997; pp. 541-546.
"Generic Coding of Moving Pictures and Associated Audio;" Nov. 13, 1994; pp. 135-137.
Hurst, N., et al.; "MPEG Splicing—Tutorial and Proposed SMPTE Standard;" Nov. 1, 1997; pp. 105-117.

* cited by examiner

*Primary Examiner* — Melur Ramakrishnaiah
(74) *Attorney, Agent, or Firm* — McClure, Qualey & Rodack, LLP (57) ABSTRACT

A video conferencing system is provided. The video conferencing system includes: a first communication device, configured to receive a video signal from a host, and convert the video signal into a first video stream; and a second communication device, configured to receive a second video stream of a scene captured by an image capturing unit, and receive the first video stream from the first communication device by using a wireless communication protocol, wherein the second communication device selects one of the first video stream and the second video stream according to a switching signal, and transmits the selected video stream to an electronic system, wherein when receiving the switching signal, the second communication device stops transmitting the selected video stream to the electronic system for a predetermined time period, and transmits header information of another video stream to the electronic system, thereby resetting decoding settings of the system.

9 Claims, 6 Drawing Sheets

VIDEO CONFERENCING SYSTEM

CROSS REFERENCE TO RELATED APPLICATIONS

This Application claims priority of Taiwan Patent Application No. 102148364, filed on Dec. 26, 2013, the entirety of which is incorporated by reference herein.

BACKGROUND OF THE INVENTION

1. Field of the Invention

The present invention relates to an electronic system, and in particular, to a video conferencing system and method for switching and decompressing video streams capable of quickly switching between video streams.

2. Description of the Related Art

With advances in technology, video conferencing systems are widely used. In a video conference, there is a need for a user to display slides, documents, and multimedia files. Meanwhile, there is also a need to transmit the images of the user to other users in the video conference. However, a conventional video conferencing system cannot quickly switch between video streams having different formats and settings, resulting in inconvenience for the users. Accordingly, there is a demand for a video conferencing system and method for switching and decompressing video streams capable of quickly switching between video streams.

BRIEF SUMMARY OF THE INVENTION

A detailed description is given in the following embodiments with reference to the accompanying drawings.

In an exemplary embodiment, a video conferencing system is provided. The video conferencing system includes: a first communication device, configured to receive a video signal from a host, and convert the video signal into a first video stream; and a second communication device, configured to receive a second video stream of a scene captured by an image capturing unit, and receive the first video stream from the first communication device by using a wireless communication protocol, wherein the second communication device selects one of the first video stream and the second video stream according to a switching signal, and transmits the selected video stream to an electronic system to perform a video conference, wherein when receiving the switching signal, the second communication device stops transmitting the selected video stream to the electronic system for a predetermined time period, and then transmits header information of another video stream to the electronic system, thereby resetting decoding settings of the electronic system

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
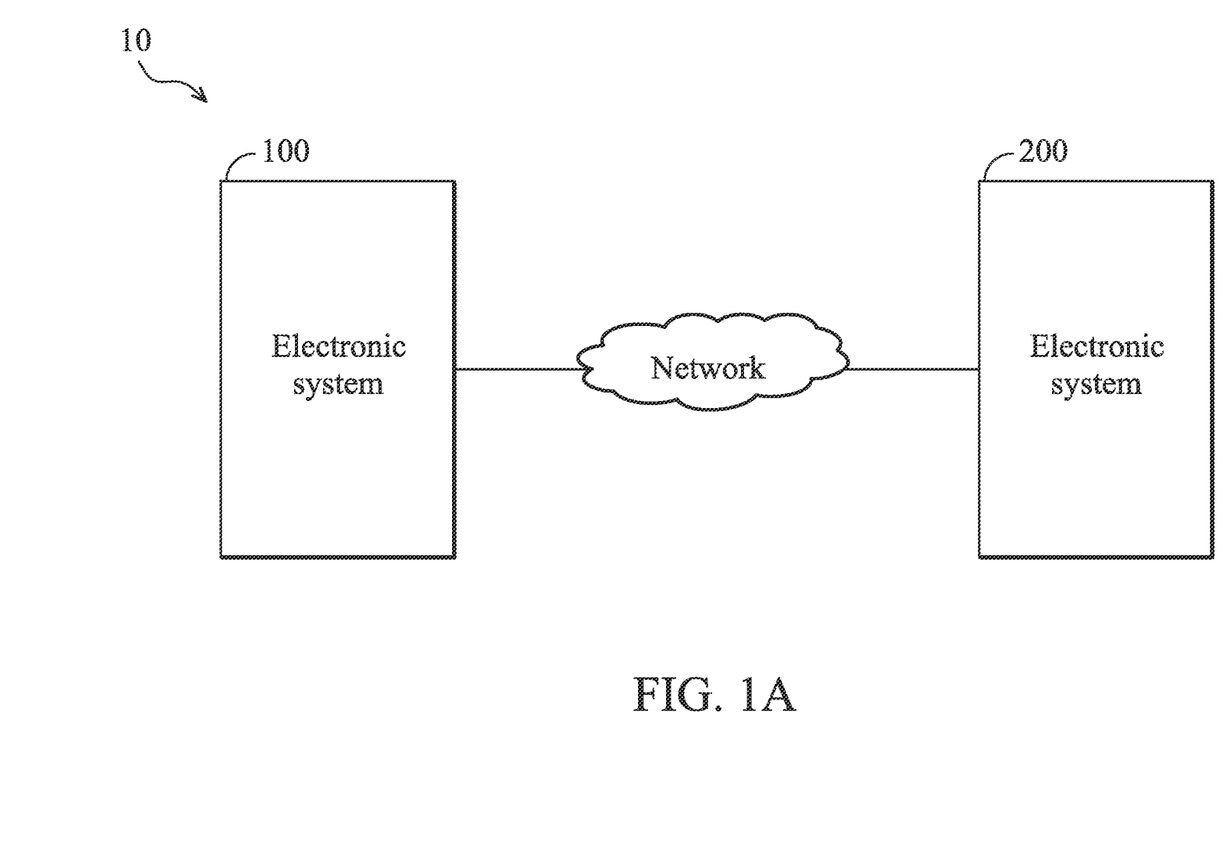
FIG. 1A is a simplified block diagram of a video conferencing system 10 in accordance with an embodiment of the invention.
Figure 1B:
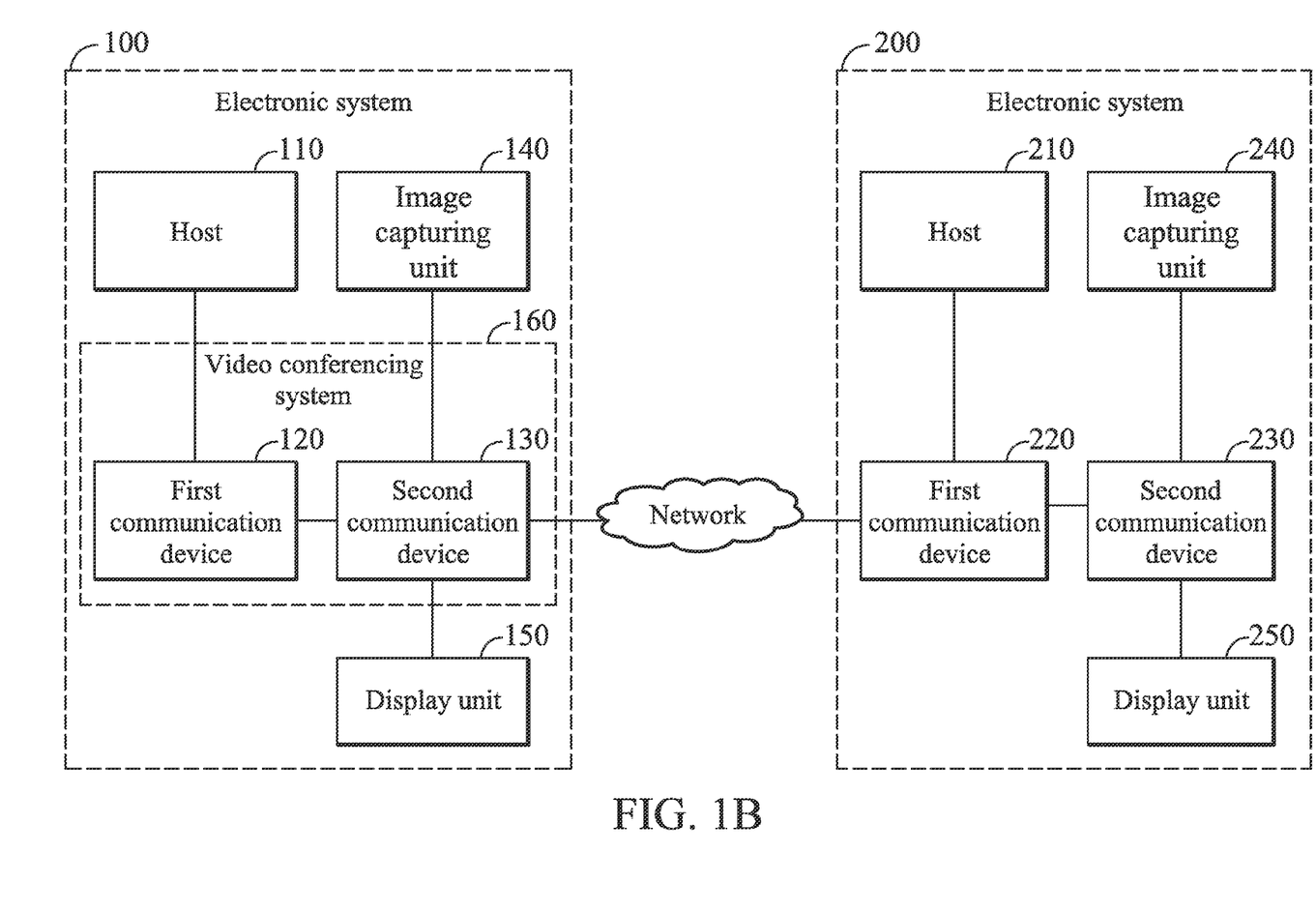
FIG. 1B is a block diagram of the electronic system 100 in accordance with an embodiment of the invention.

FIG. 1A is a simplified block diagram of a video conferencing system 10 in accordance with an embodiment of the invention. As illustrated in FIG. 1A, the video conferencing system 10 may include an electronic system 100 and an electronic system 200. The electronic systems 100 and 200 are connected to each other through a network, and receive the packets of video/audio streams from each other, thereby performing associated decoding and display processes for establishing a video conference. FIG. 1B is a block diagram of the electronic system 100 in accordance with an embodiment of the invention. As illustrated in FIG. 1B, the electronic system 100 may include a host 110, a first communication device 120, a second communication device 130, an image capturing device 140, and a display unit 150. The host 100, for example, may be a personal computer, which is coupled to the first communication device 120 via a multimedia interface (e.g. HDMI, or DVI interfaces). The first communication device 120 and the second communication device 130 are connected to each other by using a wireless communication protocol, such as Wifi or Ultra Wideband, and the first communication device 120 may compress the image from the host 110 into a video stream (e.g. a H.264 video stream), and transmit the video stream to the second communication device 130. The image capturing device 140, coupled to the second communication device 130, is configured to capture images, compress the captured images into a video stream (e.g. a H.264 video stream), and transmit the video stream to the second communication device 130. The second communication device 130 is connected to a corresponding electronic system 200 (as shown in FIG. 1A) over a wired network, wireless network, or Internet by using protocols such as SIP or H.323, and receive the video/audio signals from the electronic system 200, and play the received video/audio signals on a corresponding display unit (e.g. display unit 150) and a speaker, respectively, thereby performing a video conference. The components of the electronic system 200 correspond to those of the electronic system 100, and the details will be omitted here.

Figure 1C:
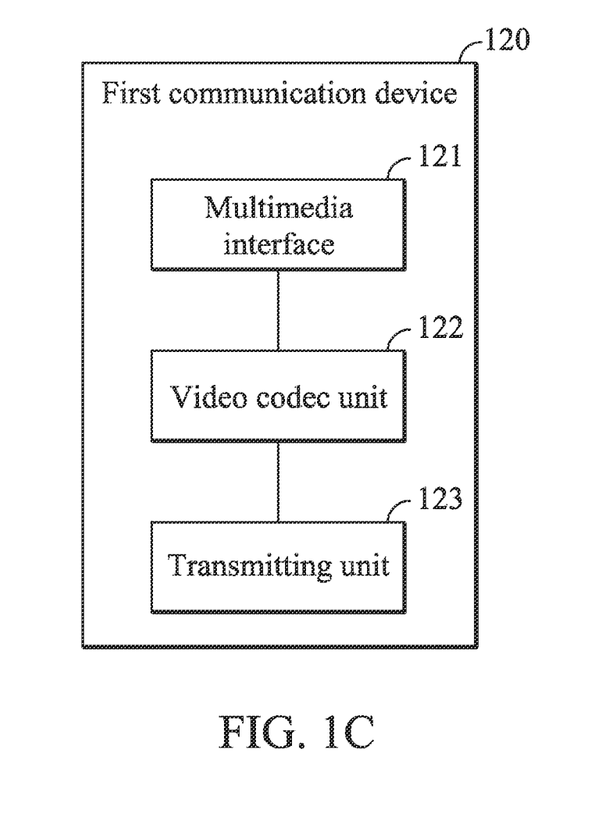
FIG. 1C is a block diagram of the first communication device 120 in accordance with an embodiment of the invention.

FIG. 1C is a block diagram of the first communication device 120 in accordance with an embodiment of the invention. As illustrated in FIG. 1C, the first communication device 120 may include a multimedia interface 121, a video encoder 122, a transmission unit 123, and a switching unit 124. The first communication device 120 receives the images from the host 110 via the multimedia interface 121, where the multimedia interface 121 may be a HDMI or VGA interface, but the invention is not limited thereto. The video encoder 122 may further encode the received images into a video stream (e.g. a H.264 video stream), and the first communication device 120 may transmit the video stream to the second communication device 130 by using a wireless communication protocol (e.g. Wifi or Ultra Wideband) via the transmission unit 123.

Figure 1D:
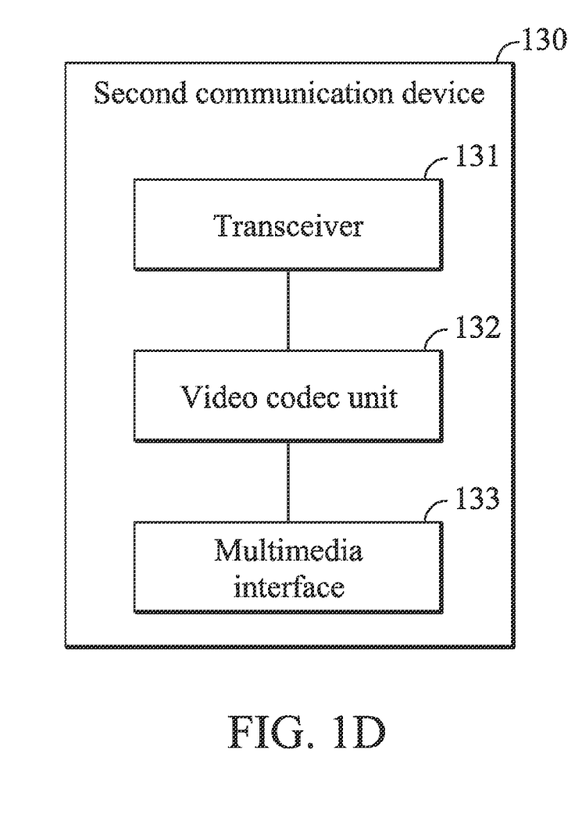
FIG. 1D is a block diagram of the second communication device 130 in accordance with an embodiment of the invention.

FIG. 1D is a block diagram of the second communication device 130 in accordance with an embodiment of the invention. As illustrated in FIG. 1D, the second communication device 130 may include a transceiver 131, one or more video codec unit 132, and a multimedia interface 133. The transceiver 131 is configured to receive the video streams from the first communication device 120 and the image capturing unit 140, receive the video stream from the electronic system 200, and transmit one of the video streams being selected to the electronic system 200. The video codec unit 132 is configured to decode the video streams from the image capturing unit 140, the host 110 and/or the electronic system 200, and display the images obtained by the decoding process to the display unit 150 via the multimedia interface 133 (details will be described later), such as using a picture-in-picture (PIP) mode or a picture-by-picture (PBP) mode. The video codec unit 132 may select one of the video streams from the host 110 or the image capturing unit 140 according to a switching signal from the first communication device 120, and transmit the selected video stream to the electronic system 200.

In a scenario of the invention, as illustrated in FIG. 1B, both the first communication device and the second communication device 130 can be regarded as a video conferencing system 160. The host 110 may transmit the video signal including the screen images and the audio signal captured by a microphone of the host 110 to the first communication device 120 via a multimedia interface (e.g. HDMI or VGA interface) of the host 110. The first communication device 120 may transmit the video signal from the host 110 in a form of video stream (e.g. H.264 video stream) to the second communication device 130 (i.e. streaming) Meanwhile, the image capturing unit 140 may keep capturing images, and transmit the corresponding video stream to the second communication device 130. For example, generally, the host 110 and the first communication device 120 can be placed near the user for convenience, such as using the host 110 nearby to display slides/videos/documents, or using the first communication device 120 nearby to control the operations of the video conference (details will be described later).

In an embodiment, the first communication device 120 may include a switching unit, configured to generate a switching signal. The user may switch between the screen images from the host 110 or the image capturing unit 140 via the switching unit (e.g. a switch button), thereby selecting the images output to the electronic system 200. The second communication device 130 may switch between the video streams from the host 110 or the image capturing unit 140 according to the switching signal from the first communication device 120, and transmit the selected video stream to the electronic system 200.

When switching between the video streams from the host 110 and the image capturing unit 140, it may result in lagging images or erroneous images upon switching due to the different video sizes and formats of the video streams. To solve the aforementioned issue, for example, when the first communication device 120 sends the switching signal, the second communication device 130 may stop transmitting the video stream from the host 110 to the decoding terminal (e.g. electronic system 200) for a predetermined time period (e.g. 3 seconds), thereby preventing decoding errors at the decoding terminal due to the switch to different video settings. Subsequently, the second communication device 130 may retransmit the header and the I-frame of the switched video stream to the decoding terminal, where the header indicates a sequence parameter set (SPS) and a picture parameter set (PPS) of the video stream, and the decoding terminal may reset the decoding settings according to the header information of the newly switched video stream.

Specifically, the decoding terminal may determine whether any packet data of a video stream is not received within 3 seconds. When there is no data of the video stream being received for 3 seconds before receiving new header information, the decoding terminal may reset the decoding settings according to the new header information, flush the image data stored in an image buffer (not shown) for use in a previous video stream, and then start the decoding process for the new video stream. In the embodiment, taking the SIP protocol as an example, when performing video streaming, there is usually no hand-shaking communication between the transmitting terminal and the receiving terminal Accordingly, the receiving terminal (decoding terminal) may passively determine whether the received packet data includes the header information. If so, the decoding terminal may reset the decoding settings according to the header information.

Figure 2:
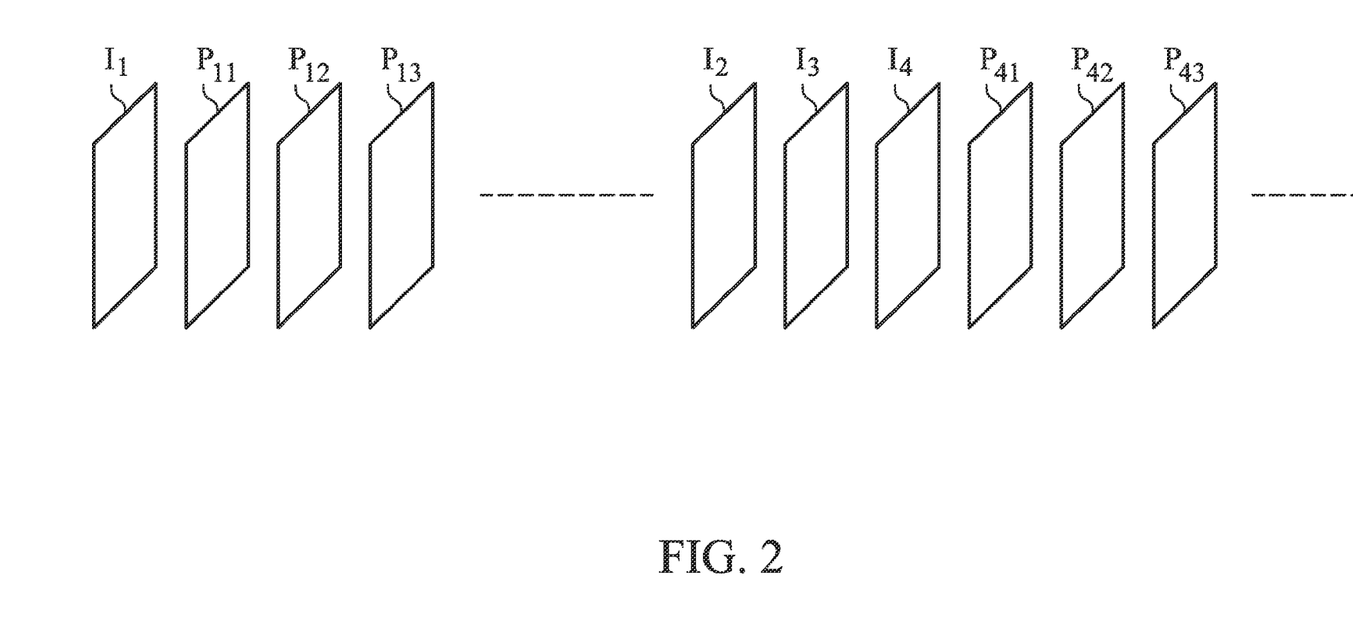
FIG. 2 is a diagram illustrating transmitting images of a video stream in the streaming process in accordance with an embodiment of the invention.

FIG. 2 is a diagram illustrating the transmitting of images of a video stream in the streaming process in accordance with an embodiment of the invention. When network conditions are poor, the packets of the video stream may be lost during transmission, and it may result in decoding errors at the decoding terminal. In the invention, after the transmitting terminal transmits the header of the new video stream, the transmitting terminal (e.g. electronic system 100) may transmit 3 I-pictures consecutively to the decoding terminal, and the decoding terminal (e.g. electronic system 200) may perform the decoding process based on the latest completely received I-picture. For example, referring to FIG. 2, the electronic system 100 transmits the video stream from the host 110 to the electronic system 200 in the beginning, and the images of the video stream includes $I_1$, $P_{11}$, $P_{12}$, and $P_{13}$, where $I_1$ is an I-picture and $P_{11}$~$P_{13}$ are P-pictures (e.g. predicted image based on image I1 as a reference picture), where time points of the images $I_1$ and $P_{11}$~$P_{13}$ are different. After transmission of the image $P_{13}$, the user may utilize the first communication device 120 to switch to the video stream from other sources, such as switching to the video stream from the image capturing unit 140. Afterwards, the second communication device 130 may stop transmitting the video stream of the host 110 to the electronic system 200 for a predetermined time period (e.g. 3 seconds), and retransmit the header of the video stream from the image capturing unit 140 to the electronic system 200. The second communication device 130 may further transmit 3 I-pictures consecutively to the electronic system 200, and then transmit the subsequent P-pictures, such as P41, P42, P43, etc., where P41~P43 indicates the P-pictures predicted from image 14 as a reference picture. It should be noted that the electronic system 200 (i.e. decoding terminal in the embodiment) may perform a subsequent decoding process based on the latest completely received I-picture as the reference picture. If the latest completely received I-picture is 12, the electronic system 200 may regard the image 12 as the reference picture with which to perform the decoding process of images P41~P43. After completing the decoding of the images by the electronic system 200, the electronic system 200 may display the images obtained from the decoding process on a corresponding display unit.

It should be noted the flow having the electronic system 100 as the transmitting terminal and the electronic system 200 as the receiving terminal is described in the aforementioned embodiment. During the video conference, the electronic systems 100 and 200 may be either the transmitting terminal or the receiving terminal in pair, and the flow of transmission and reception can be referred to in the aforementioned embodiment.

Figure 3A:
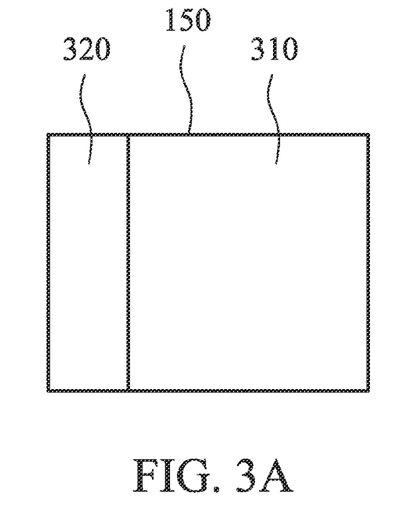
FIGS. 3A~3C are diagrams illustrating images displayed by the display unit 150 in accordance with an embodiment of the invention.
Figure 3B:
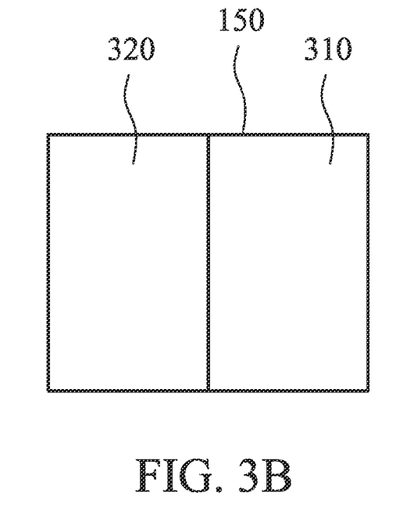
Figure 3C:
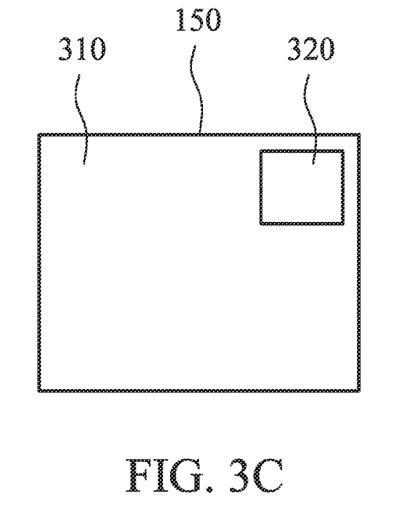

FIGS. 3A~3C are diagrams illustrating images displayed by the display unit 150 in accordance with an embodiment of the invention. As illustrated in FIG. 3A, when a video conference is performed using the electronic systems 100 and 200, the electronic system 100 may display the images from the electronic system 200 on the display unit 150, such as an area 310 of the display unit 150. The second communication device 130 may simultaneously display the images from the image capturing unit 140 on an area 320 of the display unit 150. It indicates that the user may view the images from the electronic system 200 (e.g. slides displayed on the host, or captured images in the electronic system 200) and the images of the user on the display unit 150. It should be noted that the locations and sizes of the areas 310 and 320 can be set freely according to user's need. For example, the picture-by-picture (PBP) mode shown in FIG. 3B, or the picture-in-picture (PIP) mode shown in FIG. 3C can be used.

Figure 4:
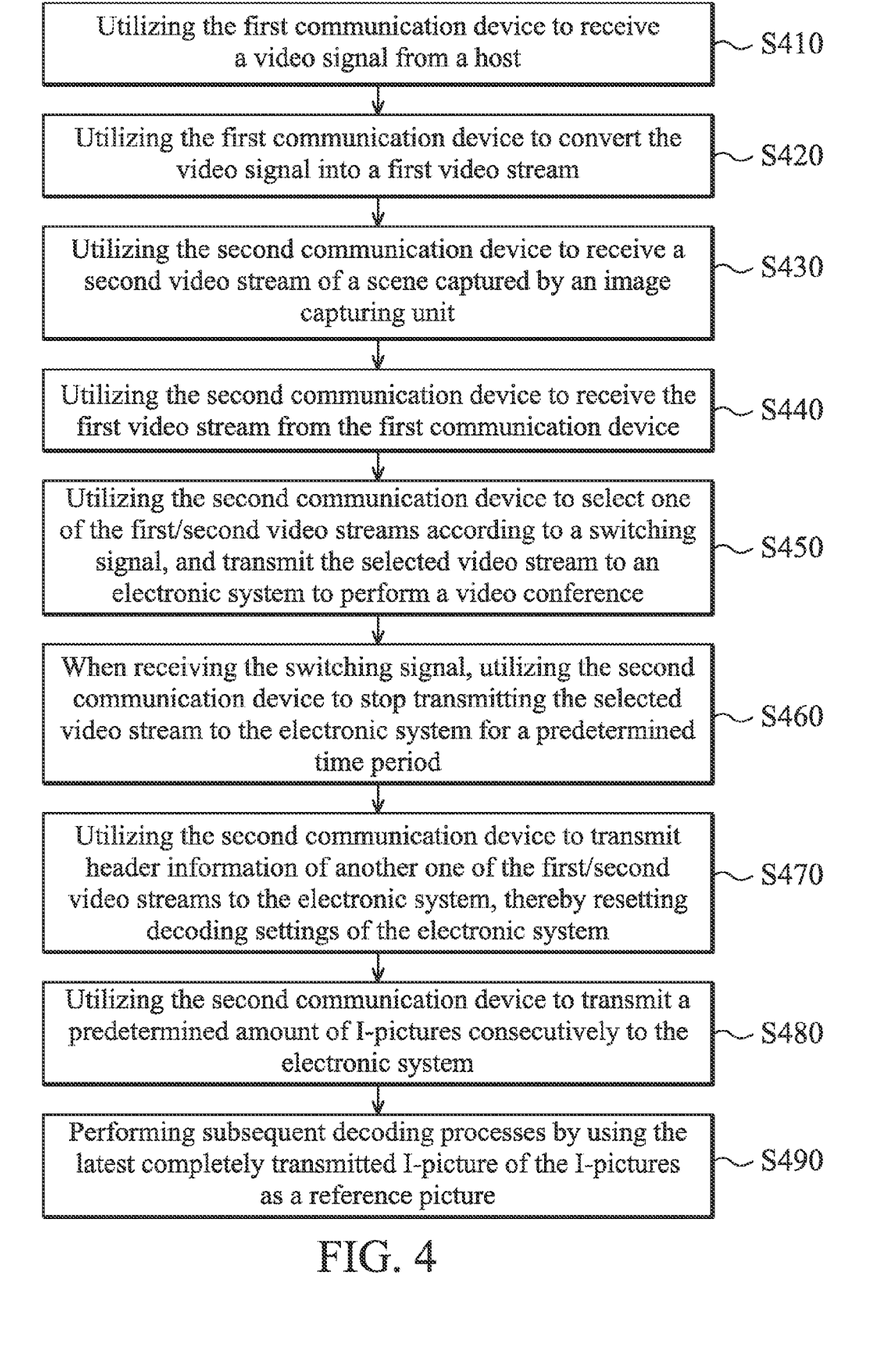
FIG. 4 is a flow chart illustrating the method for switching and decompressing video streams in accordance with an embodiment of the invention.

FIG. 4 is a flow chart illustrating the method for switching and decompressing video streams in accordance with an embodiment of the invention. In step S410, the first communication device 120 receives a video signal from the host 110. In step S420, the first communication device 120 may convert the video signal to a first video stream. In step S430, the second communication device 130 receives a second video stream of a scene captured by the image capturing unit 140. In step S440, the second communication device 130 receives the first video stream from the first communication device 120. In step S450, the second communication device 130 selects one of the first video stream and the second video stream according to a switching signal (e.g. from the first communication device 120), and transmits the selected video stream to an electronic system (e.g. electronic system 200) to perform a video conference. In step S460, when the second communication device 130 has received the switching signal, the second communication device 130 stops transmitting the selected video stream to the electronic system (e.g. electronic system 200) for a predetermined time period (e.g. 3 seconds). In step S470, the second communication device 130 re-transmits the header information of another one of the first video stream and the second video stream, thereby resetting the decoding settings of the electronic system.

In step S480, the second communication device 130 consecutively transmits a predetermined amount of I-pictures to the electronic system 200. In step S490, the electronic system 200 performs subsequent decoding processes by using the latest completely transmitted I-picture of the plurality of I-pictures as a reference picture.

In view of the above, a video conferencing system and method for switching and decompressing video streams, which are capable of quickly and correctly switching between video streams having different formats and settings and transmitting the switched video stream to the corresponding electronic system or video conferencing system, are provided.

The methods, or certain aspects or portions thereof, may take the form of a program code embodied in tangible media, such as floppy diskettes, CD-ROMs, hard drives, or any other machine-readable (e.g., computer-readable) storage medium, or computer program products without limitation in external shape or form thereof, wherein, when the program code is loaded into and executed by a machine such as a computer, the machine thereby becomes an apparatus for practicing the methods. The methods may also be embodied in the form of a program code transmitted over some transmission medium, such as an electrical wire or a cable, or through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video conferencing system, comprising:
   a first communication device, configured to receive a video signal from a host, and convert the video signal into a first video stream; and
   a second communication device, configured to receive a second video stream of a scene captured by an image capturing unit, and receive the first video stream from the first communication device by using a wireless communication protocol,
   wherein the second communication device selects one of the first video stream and the second video stream according to a switching signal, and transmits the selected one of the first video stream and the second video stream to an electronic system correspondingly to perform a video conference,
   wherein when the second communication device has received the switching signal, the second communication device stops transmitting the selected one of the first video stream and the second video stream to the electronic system for a predetermined time period, and then transmits header information of another one of the first video stream and the second video stream to the electronic system, thereby resetting decoding settings of the electronic system.

2. The video conferencing system as claimed in claim 1, wherein the header information comprises a sequence parameter set and a picture parameter set.

3. The video conferencing system as claimed in claim 1, wherein after transmitting the header information to the electronic system, the second communication device further transmits a predetermined amount of I-pictures consecutively to the electronic system.

4. The video conferencing system as claimed in claim 1, wherein the electronic system performs subsequent decoding processes by using the latest completely transmitted I-picture of the plurality of I-pictures as a reference picture.

5. The video conferencing system as claimed in claim 3, wherein the predetermined amount is 3.

6. The video conferencing system as claimed in claim 1, wherein the first communication device is coupled to the host via a multimedia interface.

7. The video conferencing system as claimed in claim 1, wherein the wireless communication protocol is the SIP protocol.

8. The video conferencing system as claimed in claim 1, wherein the second communication device further receives and decodes a third video stream from the electronic system to obtain a plurality of images, and displays the plurality of images on a first area of a display unit, wherein the second communication device further displays images obtained by decoding the second video stream on a second area of the display unit.

9. The video conferencing system as claimed in claim 8, wherein the first area and the second area are arranged in a picture-in-picture mode or a picture-by-picture mode for display.

* * * * *